Aug. 10, 1965   R. L. SAMSON   3,200,309
BI-DIRECTIONAL RELAY CIRCUIT USED IN A MULTIPLE
CHART COURSE TRACING SYSTEM
Original Filed Aug. 27, 1959   2 Sheets-Sheet 2
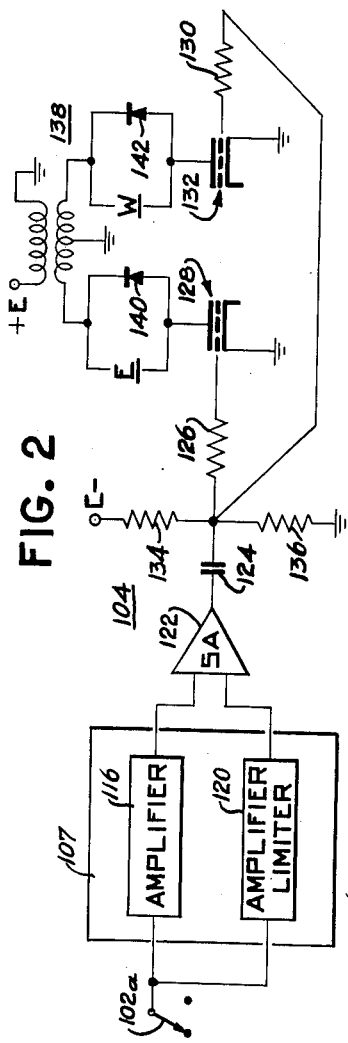
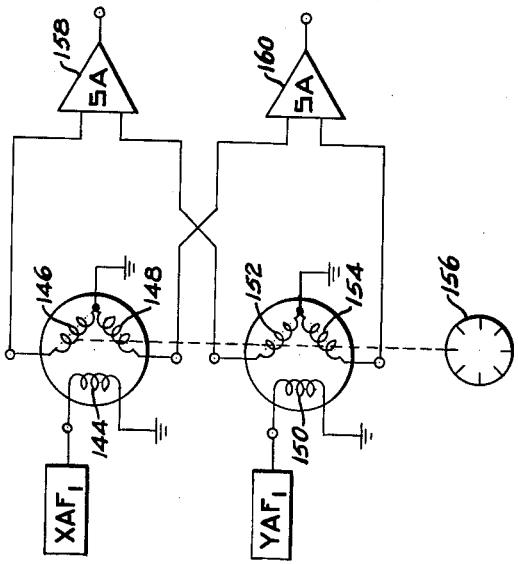
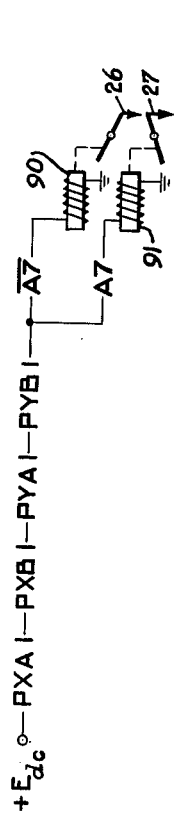
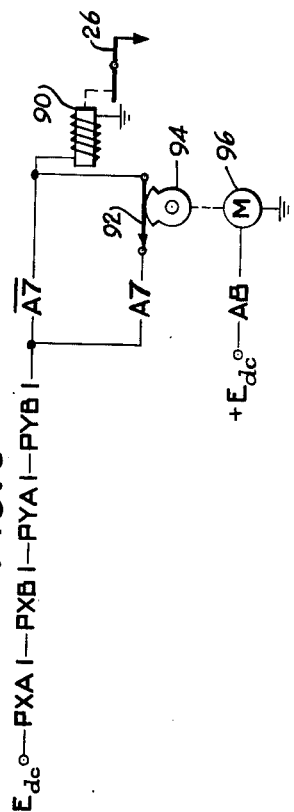
INVENTOR.
RALPH L. SAMSON
BY
HIS ATTORNEY 3,200,309
BI-DIRECTIONAL RELAY CIRCUIT USED IN A
MULTIPLE CHART COURSE TRACING SYSTEM
Ralph L. Samson, Wyckoff, N.J., assignor to Curtiss-
Wright Corporation, a corporation of Delaware
Original application Aug. 27, 1959, Ser. No. 836,527, now
Patent No. 3,036,303, dated May 22, 1962. Divided
and this application Feb. 6, 1962, Ser. No. 176,842
4 Claims. (Cl. 317—155.5)

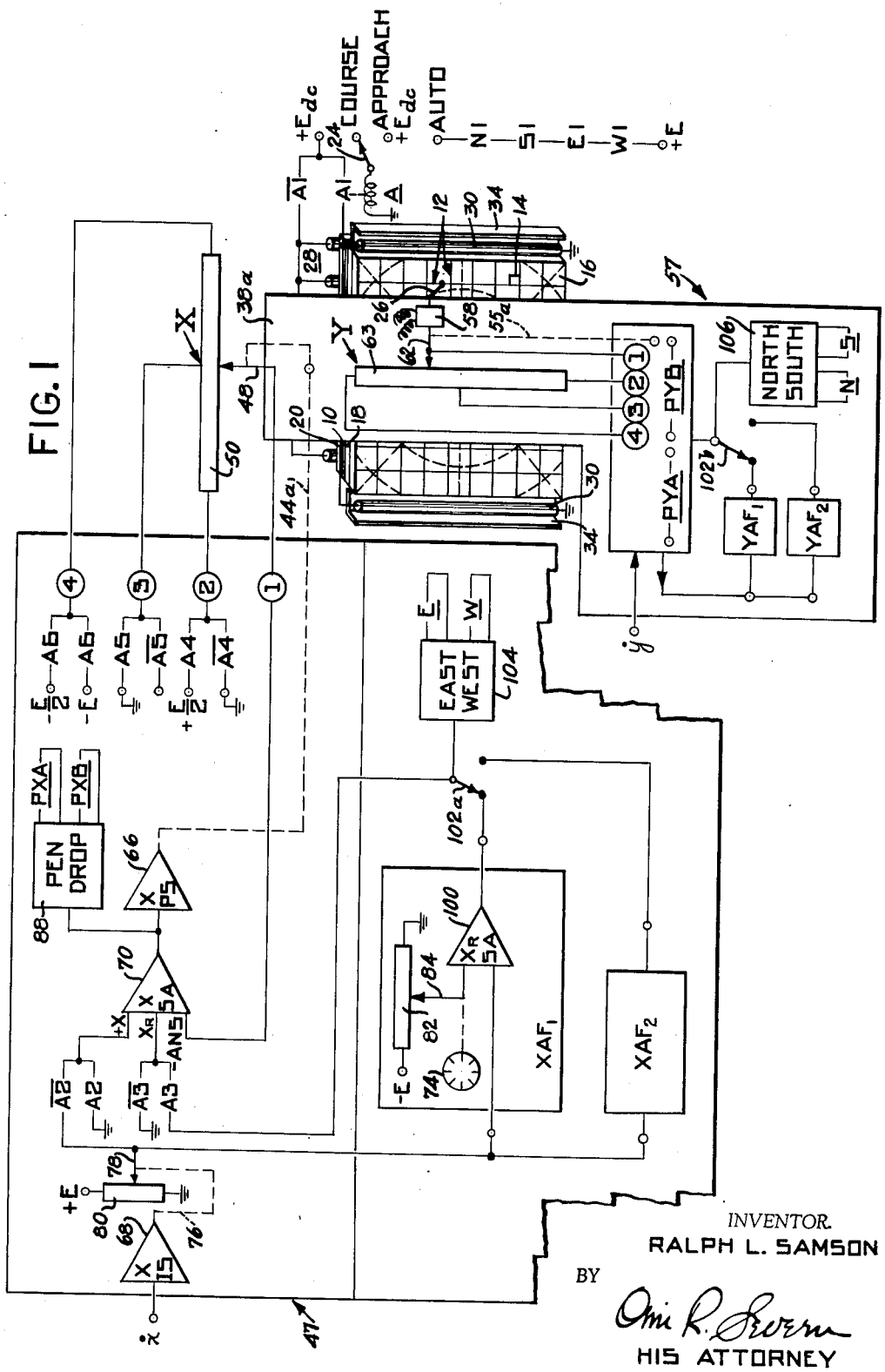

This invention relates to plotting equipment of the kind wherein a mathematical funtcion or a course is plotted on a chart or map by means of a recording pen. More particularly the present invention relates to plotting equipment that includes means for changing the chart scale factor upon occasion to provide a detailed record on an expanded scale.

This application is a division of my copending application, Ser. No. 836,527, filed August 27, 1959, now Patent No. 3,036,303, dated May 22, 1962.

The present invention has application in the general field of function recording, for example in computing and recording the value of a dependent variable as a function of an independent variable. As another example, the present invention has application in the situation where it is desired to provide a time record of a variable condition, such as temperature, altitude, etc. Further the invention has particular utility in the recording of a path of an actual or simulated vehicle on a map. By way of example only, the invention will be described with reference to the charting of the flight path of an actual or simulated aircraft.

Recording apparatus of the general character contemplated by the present invention is known in the art, an example being U.S. Patent No. 2,529,568, granted to R. C. Dehmel on November 7, 1950. This patent discloses a rotatable chart supporting table, which is driven in one polar coordinate dimension, namely azimuth, while the cooperating pen is driven in the other variable, range. When a scale change is desired or required, the pen is lifted out of engagement with the map and is transferred to a location more distant from the chart origin and is then restored to engagement with the map. This arrangement advantageously utilizes one and the same charting surface, and the entire such charting surface for recording the plot both to the normal and the expanded scales. This is made practical by reason of the fact that the map legend is basically solely in the form of polar coordinate indicia reflecting the proximity of an airport, either to the normal or the expanded scale.

United States Patent No. 2,857,234 discloses other examples of dual course recording apparatus of the general character contemplated by the present invention. Here the normal scale or course map is stationary and the recording pen is driven in both Cartesian dimensions. The expanded scale or approach map is separate from the course map. It is provided with a second pen which remains at the margin of the approach map until the course pen enters the approach area portion of the course map. Thereafter both pens trace the course to their respective scales until the course pen leaves the approach area, whence the approach pen remains at the margin once more. The arrangement is such, that while the course pen is outside of the approach area and also its horizontal and vertical extensions, the approach pen is at a corner of the approach map. When the course pen enters an extension of the approach area, the approach pen will move along the margin slaved to the course pen, so as to be ready to commence tracing when the course pen enters the approach area. When the course pen leaves the approach area, the approach pen will reach a margin and will continue to trace along such margin, until the course pen leaves the appropriate extension of the approach area. At this time the approach pen will have reached a corner of the approach map, and will remain stationary thereat.

It is thus seen that in the dual course recorder of the Dehmel patent but a single recording surface is required, but the apparatus is restricted in several respects. For one, it is restricted to polar coordinate recording. For another, it requires that both the recording surface and the recording pen be driven in their respective polar coordinate dimensions. For a third, even the course map is restricted to proximity of the landing field. The apparatus of the mentioned Patent 2,857,234 on the other hand is capable of recording in a Cartesian coordinate system. Further, it is suitable for imparting drives in two dimensions either to the recording surface or to the pen, as well as driving the pen in one dimension and the map in the other. Further, the course map is not restricted to representation of the vicinity of the landing field, but represents a long distance course, as for example a major portion of the globe. It is however restricted in the respect of requiring two recording surfaces and two pen drives.

It is an object of the invention to provide automatic dual course recording apparatus that employs but a single recording surface and which is suitable for recording in Cartesian coordinates.

Another object of the invention is to provide automatic dual course recording apparatus that employs but a single recording surface and in which either the recording pen or the recording surface may be driven in two dimensions or each may be driven in one dimension.

It is another object of the invention to provide automatic dual course recording apparatus which employs but a single recording surface and in which the course map may represent a large portion of the earth.

The invention features means that compare the position instantly required of the tracing pen on the course map with respect to the location of the approach area as represented on the course map. Two such comparing or sensing means, herein denominated "bidirectional relays," are provided. One bidirectional relay system senses whether or not the instant X or East-West location of the course is to the left of the right extremity of the approach area, and also to the right of its left extremity. Similarly the other sensing means senses whether or not the Y or North-South location of the instant plot is below the upper extremity of the appproach area and also above its lower extremity. Presence of the vehicle in the approach area is sensed by virtue of the fact that all four conditions must be satisfied, namely the vehicle must be to the left of the right bound and to the right of the left bound, below the upper and above the lower bound of the approach area. A coincidence circuit responds to coincidence of these four conditions and effects transfer from course recording to approach recording. Retransfer to course recording is sensed by failure of any one of the four conditions.

The bidirectional relay is regarded as novel in its own right; as a matter of fact the circuitry is also employed for a totally different purpose, namely in connection with the lifting of the tracing pen upon transfer from the course map to the approach map and vice-versa.

Other features, objects and advantages of the invention will be apparent upon consideration of the following more detailed specification of which the appended claims form a part, when considered together with the accompanying drawings, in which:

FIG. 1 is a schematic drawing, partly in block form, of dual course recording apparatus in accordance with a preferred embodiment of the invention;

FIG. 2 is a schematic drawing of the sensing circuitry for sensing the East-West location of the vehicle, utilized in FIG. 1;

FIG. 2a is a graphical representation of the response of part of the circuitry of FIG. 2;

FIG. 3 is a schematic drawing of circuitry for lifting and dropping the recording pen upon transfer from course to approach recording and vice-versa, utilized in the arrangement of FIG. 1;

FIG. 4 is a schematic drawing of pen drop and lift circuitry alternative to that of FIG. 3; and FIG. 5 is a schematic drawing of circuitry for modifying the operation of the apparatus of FIG. 1 to take into account earth curvature.

The invention will first be described with reference to a dual recorder wherein the entire common writing surface is employed for recording to both normal and expanded scale, and more particularly with reference to an arrangement whereby display of the course map is substantially suppressed during approach recording and display of the approach map is substantially suppressed during course recording. The latter arrangement is more fully described and also claimed in a co-pending application of Milton Eisenstark, Serial No. 836,387 filed August 27, 1959, now Patent No. 2,948,580, dated August 9, 1960. Subsequently the invention will be described with reference to a recording surface also is common to both maps, but wherein the approach map is separate from the course map and is presented as an insert map for example. Insofar as practicable, parts common also to the mentioned Eisenstark application will be identified by like reference numerals.

Referring to FIG. 1, the course map 10 is imprinted on translucent paper of the customary type. It is provided with the usual grid coordinate system, generally identified as by 12. The approach area as represented on course map 10 is designated by the small square 14.

The apparatus includes four members of substantially conforming shape; these members are, proceeding from front to rear: a transparent board or plate 16, a semi-transparent board 18, the map 10 and a second transparent board 20. The approach map is inscribed on the rear surface of the front transparent board 16 in the form of the indicated polar system whose origin may be the point of touch-down of an air field, for example. The inscription of the approach map on the rear surface of the transparent member 16 may be accomplished by way of etching, cutting of grooves, or painting.

Selector switch 24 is operable from the indicated "course" position, to an intermediate "approach" position, to a third "automatic" position. It is ararnged that when switch 24 is in the course position, the course map 10 is visible to the viewer while the approach map is substantially invisible; and vice-versa in the case of selection of approach. Also, the tracing pen 26 traces the flight path in accordance with the location and at a speed as dictated by the course map scale and location requirements upon course selection, and in accordance with the approach map requirements upon selection of "approach." In the "automatic" position of switch 24, the transfer from course to approach is accomplished automatically. That is, the approach map will be visible to the viewer and the pen 26 will trace the flight path in accordance with the approach map scale and location requirements upon such transfer. Conversely when transfer from approach to course recording is required, automatically the course map will be visible to the viewer and the pen 26 will be shifted to the proper location as required by course map scale and location requirements. One and the same pen, namely 26, and one and the same writing surface, namely the front surface of transparent member 16 are utilized for recording both course and approach. The viewer, who may be the flight instructor, is under the optical illusion that in the one case the pen is tracing on the course map then solely visible to him, and in the other case on the approach map, then solely visible to him. In transferring from course to approach and vice versa, the pen 26 transfers from its instant geographic location on one map to the same geographic location on the other map and continues to trace the flight path from the point just transferred to onward in accordance with the scale of the other map. This is accomplished in the following manner.

The four members 16, 18, 10 and 20 are arranged in adjacent, contiguous layers. The member 20 serves principally to support the map 10 in upright position, while providing a light pervious medium through which light passes from a bank of incandescent or fluorescent line lamps generally designated as by 28. The light further passes through map 10 and the members 18 and 16, and thereby displays the map 10 to the viewer; this preponderates in visual effect over the approach map.

The switch 24 is connected to the supply voltage +E D.C. In the indicated course position it serves necessarily to deenergize an approach relay A whose one end is grounded and whose other end is connected to the "approach" contact. It serves to energize the relay upon transfer to "approach." The relay coil is designated both in conventional manner and also by underlining of the letter A. The remaining relay coils used herein will be designated simply by reference letters underlined with the conventional illustration of the relay coil omitted. The "normally closed" (NC) contacts of the several relays used herein are designated by the reference letters identifying the associated relay coils with a bar thereabove and no bar below, while the "normally open" (NO) contacts are designated in similar manner but with no bar appearing above or below the reference letters. Additionally the normally open and closed contacts constituting one set for a given relay are differentiated from those constituting another set of the same relay by individual numbers following the reference letters. Thus for example, one set of such contacts of the relay A is illustrated in FIG. 1, designated as $\overline{A1}$ and A1. This simplifying convention for designating relays is similar to the conventions used in U.S. Patents 2,750,986 and 2,771,600. "Normalcy" as used herein refers to the state of the contacts with all sources of energization removed.

With switch 24 operated to select course, supply voltage +E D.C. is applied to the upper ends of the lamps 28 through the NC contact 1 of relay A, thereby lighting the lamps, whose lower ends are grounded. With switch 24 placed in the approach position the relay is energized, the lamps 28 are extinguished, and instead another pair of similar lamps 30 are connected to the supply voltage through the NO contact 1 of the relay. The latter lamps light, their lower ends likewise being grounded. Lamps 30 edge light the transparent board 16. The light emerging from the lamps 30 enters the transparent plate 16 at the lateral edges thereof, and passes through plate 16 in a generally planar path transverse to the front to rear direction of view. In passing through the plate 16, the light rays strike irregularities of the rear surface constituting the inscription of the approach map and are reflected frontally towards the viewer. The irregularities are illuminated and render the approach map visible. At the same time the course map is obscured by the semi-transparent member 18.

The optical properties of the semi-transparent plate 18 are well known; it is opaque and in fact essentially reflective when viewed from either side thereof so long as the light intensities on such sides are substantially equal. If however the light intensities are unequal, the plate is substantially transparent when viewed from the side exposed to the lower light intensity, but remains substantially opaque and reflective when viewed from the side exposed to the high light intensity. In order to avoid undesired illumination of the map 10 by the lights 30, the latter are masked in all but the desired front and lateral directions by means of angle shields 34 which are coextensive with the lights 30 and the remaining described members, namely, lamps 28, plates 16, 18 and 20, and map 10.

The pen 26 is attached to a solenoid block 58 which in turn is mounted for motion in the Y or North-South direction on a carriage 38a that is in turn arranged for movement in the X or East-West direction. The drive means for imparting the motion in the two dimensions employs alternating voltage type analog computing circuitry. The East-West unit 47 includes a position servo system 66, an integrating servo system 68 and a summing amplifier 70. The functioning of these components is explained in detail in Patent 2,798,308 for example. Briefly summarized, the summing amplifier 70 delivers an output signal that represents the algebraic summation of the input signals applied thereto through respective internal summing resistors.

For simplicity of the disclosure, the summing amplifier is designated by SA enclosed, together with the variable $x_r$ that the summing amplifier computes, in a triangle, and the input resistors may be assumed to be contained within the summing amplifier proper.

The position servo 66 includes internally a summing amplifier that energizes a control winding of a two-phase induction motor. The motor is provided with a second phase winding which is energized by a constant reference voltage, that is 90° out of phase with a reference voltage $+E$ encountered hereinafter. The signal voltages which actuate the summing amplifiers and servo amplifiers are either in phase with or in phase opposition to the reference voltage $+E$, as reflected by plus or minus signs respectively. There is also employed a further reference voltage $-E$, which is of like magnitude as, but opposite phase to the reference voltage $+E$. The servo motor is bi-directional, the direction of rotation depending upon the net phase of the external input signal applied to the servo amplifier. The velocity of rotation is in accordance with the magnitude of the net external input signal. The servo motor drives a generator that provides a further input signal to the servo summing amplifier for velocity feedback purposes. The servo motor further drives through the mechanical connections 44a, which are intended to represent the drive means 42 to 45 collectively, the carriage assembly 38a which is intended to represent the carriages 38 and the members supported thereby, including the slider 48 of potentiometer 50. The potentiometer is grounded at its left end and connected to the voltage $-E$ at its right end. The slider 48 connects to the input of the amplifier 66 and serves as an answer signal.

The servo motor is actuated in response to non-zero net input signal and comes to a rest when the answer signal rebalances the net external signal.

In the interest of clarity the servo system is designated by PS, enclosed with the variable $x$ that the servo motor shaft position represents, in a triangle. It is intended that this include the servo summing amplifier with its input resistors, the servo motor and velocity feedback generator.

The integrating servo 68 is internally substantially of the same construction as the position servo 66, but is not provided with an answer input. Its motor runs for so long as the net external input signal, herein designated as $x$ is non-zero, and comes to a rest when such input signal reaches zero. For convenience the system is designated by IS, enclosed with the particular variable that the servo motor shaft position represents in a triangle. It is intended to include the same units as are included in the position servo 66.

At the beginning of the training exercise the instructor will position the pen 26 manually to the point of departure of the fictitious flight. He will also set in the X and Y coordinates of the center of the approach square 14, reckoned with reference to the lower left-hand-corner-origin of the course map 10 and in accordance with its scale. He accomplishes this by opera-tion of a graduated dial 74 contained within the East-West system 47 and a similar calibrated dial associated with the block 57 that represents the North-South system supported on carriage 38a. The system 57 is structurally and functionally similar to the system 47 and is therefore not described in detail. It may be assumed hereinafter that for every component and event described with reference to the X system 47 there exists a corresponding component and event in the Y system 57. The instructor may alternatively set in the coordinates of point 72 during the course of the training exercise.

As the training exercise proceeds, a flight computer, for example that illustrated in Patent No. 2,529,468 will deliver the input voltage $x$ to the integrating servo 68 and the voltage $y$ to a corresponding integrating servo contained within units 57. These voltages represent respectively East-West and North-South ground speed of the simulated flight. The selector switch 24 will be in the automatic position, and the pen 26 will trace a flight path on what appears to the instructor to be the course map 10 (and in accordance with its scale), but is actually the front surface of the transparent plate 16. This is accomplished in the following manner.

In response to the East-West ground speed input signal $\dot{x}$, the integrating servo 68 operates through mechanical connections designated by 76 the slider 78 of a linear (uniform contour) potentiometer 80 that is energized by reference voltage $+E$ at its upper end and is grounded at its lower end. The potentiometers used herein are all linear. Accordingly the slider 78 derives a signal that is proportional to the $x$ position of the flight on the course map in accordance with its scale. This signal is applied through the NC contact 2 of the approach relay as input signal $+x$ to the position servo 66. The servo drives the carriage assembly 38a to a position corresponding to the computed East-West value, and also drives the slider 48 of the potentiometer 50 to a corresponding position. The slider 48 provides an answer signal of negative phase ($-$ANS) to the servo, rebalancing signal $+x$ on a continuous basis.

The potentiometer 50 is connected to the input terminals 1, 2, 3 and 4 of the X system respectively from the slider 48, its left end 50 representing the Y axis, its center tap, and its right end representing the right extremity of the chart. Terminal 1 is connected to the summing amplifier 70 to provide the answer signal. The terminals 2, 3 and 4 are presently respectively: connected to ground through the NC contact 4 of the approach relay, open circuited, and connected to the reference voltage $-E$ through the NC contact 6 of the approach relay with this relay deenergized in course map recording. Upon energization of the relay for approach map recording these terminals are respectively: connected to the reference voltage $+E/2$ through the NO contact 4 of the relay, grounded through its NO contact 5, and connect to the reference voltage $-E/2$ through the NO contact 6 of the relay. The corresponding Y potentiometer 63 has its slider 62 connected to a corresponding terminal 1, its lower end, center tap and upper end connected to corresponding terminals 2, 3 and 4. These four terminals of the Y system 57 are further connected to units analogous to that of the X system and not specifically illustrated. The slider 62, solenoid block 58 and pen 26 are driven by an analogous Y position servo system corresponding to system 66 through connections designated as by 55a. The effect of the connections of the terminals 2, 3 and 4 of the X and Y systems is to place the chart origin at the lower left hand corner of the chart for course recording and to the center of the approach area upon approach recording. This is in view of associating the grounded point with the origin. The reference voltages $-E/2$ and $+E/2$ represent the left and right edges of the chart in relation to the X system and the lower and upper limits of the chart with reference to the Y system for approach recording.

The position servo 70 is provided with a second input $+x_R$ that is presently grounded through the NC contact 3 of the approach relay A. The voltage derived from slider 78 is further applied as input to the summing amplifier 100 that is contained within a unit $XAF_1$ associated with the airfield represented by the approach area 14. A corresponding unit $YAF_1$ is provided in the Y system 57. Provision may be made for further airfields and to this end units $XAF_2$ and $YAF_2$ are provided which may be selected by operation of a selector switch 102, designated as 102a in the X unit and 102b in the Y unit. The additional airfield blocks are analogous to the unit $XAF_1$ and therefore are illustrated merely in block form. The unit $XAF_2$ is also connected to the slider 78 and the corresponding unit $YAF_2$ will be connected correspondingly in the Y system. Further airfields may be included in which case the switch 102 is given additional positions.

The summing amplifier 100 delivers an output voltage representing the instant X position on the approach map in accordance with its scale. Amplifier 100 receives a further, biasing input signal from the slider 84 of a linear potentiometer 82 that is energized by the reference voltage $-E$ at its left end and is grounded at its right end. The slider 84 is positioned in accordance with the X coordinate of the geometric or physical center of the approach area 14 referred to the course may, which is associated with airfield $XAF_1$, by operation of the dial 74 mechanically connected thereto. The geometric center of the approach area thus serves as a location geographically referable to both maps. The amplifier 100 thus provides a measure of the difference, referred to the course map, of the instant X position of the charting pen and the geometric center approach area, or referred to the approach map, of the X distance from its origin located at such geometric center. The course and approach map origins are physically non-coincident. Its output is connected through switch 102a to the NO contact 3 of the approach relay, which is presently open circuited, and also to an East-West sensing network 104 described hereinafter in greater detail with reference to FIG. 2. The network controls an E or East and a W or West relay. These relays are energized respectively when the instantly required X position of the pen 26 on the course map is east of the right limit and west of the left limit of the approach area 14. A North-South sensing network 106 is provided in the Y system 57. It controls an N or North relay and a S or South relay. These two relays are energized when the instantly required position of the pen 26 is above the lower limit and below the upper limit respectively. Energization of all four relays signifies presence of the pen 26 in the approach area. With the switch 24 in the automatic position, the approach relay will be energized through the circuit including the source $+E_{dc}$ and the NO contacts 1 of the W, E, S and N relays and switch 24, as indicated, and will be deenergized whenever any one of these relays is deenergized.

Referring to FIG. 2 for a description of the circuitry of the East-West sensing unit 104 the input signal from switch 102a is applied to an electronic function generator 107, which will be referred to as a "amplitude-sensitive-amplifier" and produces the function illustrated by the heavy solid line curve 108 illustrated in FIG. 2a. The origin in FIG. 2a represents the center of the airfield area 14, whereas the dashed vertical lines 111 and 113 represent the easterly and westerly limits of such area. In response to an input signal within the limit lines 110 and 112 the output of the amplitude-sensitive-amplifier 107 is seen to be zero. To the right of line 112 the response is linear, and is also linear to the left of limit 110 and symmetrically so with respect to the origin. The function 108 is generated by combination of a straight line function 114 produced by an amplifier 116 contained within unit 107, and of a function 118 (FIG. 2a) produced by the amplifier-limiter 120, also contained within unit 107. Each of the units 116 and 120 receives as input signal from switch 102a the $x_R$ output signal of the selected XAF unit (FIG. 1). The amplifier-limiter function 118 is of equal but opposite slope to the straight line curve 114 within the limit lines 110 and 112 and is substantially flat therebeyond. For examples of structural configurations of amplifier-limiters reference is made to a co-pending application of mine and of Charles F. Zahner Serial No. 770,208, filed October 28, 1958, now Patent No. 2,947,088, dated August 2, 1960. This patent also discloses alternative means for generating the amplitude-sensitive amplification function 108. The output signal of the units 116 and 120 are combined in a summing amplifier 122 whose output accordingly is represented by the characteristic 108.

The output signal of the summing amplifier 122 is applied through a blocking capacitor 124 and then through a grid current limiting resistor 126 to the grid of a triode 128 and also through a similar grid current limiting resistor 130 to the grid of a similar triode 132. The grids are biased to a potential permitting conduction of both triodes for so long as the output signal of the amplifier 122 is within the limit lines 111 and 113; in other words for so long as such output signal corresponds to the confines of the approach area 14. This is accomplished by means of a voltage divider biasing network that includes a resistor 134 that is connected at its upper end to the negative bias supply voltage C— and at its lower end to the junction of capacitor 124 and resistors 126 and 130, and a further resistor 136 that is connected to such junction and to ground at its upper and lower ends respectively.

The cathodes of the triodes 128 and 132 are grounded and their anodes are connected respectively through the East and West relay coils to the ends of a secondary winding of a transformer 138 whose primary winding is energized by the reference voltage $+E$. The center tap of the secondary winding is grounded, so that the relay coils receive voltage of equal magnitude but opposite phase. The coils are shunted by diodes 140 and 142 respectively.

The described circuitry functions in the following manner. The triodes 128 and 132 conduct, if at all, during the positive half cycles of the plate supply voltage applied thereto respectively. This occurs necessarily during alternate half cycles in view of the application of phase opposition voltages. When the flight is located East of the center of the approach area, the voltage applied to the grid of tube 128 will be in phase with the anode voltage, triode 128 will conduct and the E relay will be energized. As the flight proceeds west of the center but stays within the confines of the approach area, the grid and plate voltages of tube 128 will be in phase opposition; however the negative signal provided by the grid signal which concurs with positive plate voltage will be insufficient to cut the tube off. Beyond the westerly limit of the approach area as defined by line 113, such negative input signal is sufficient to cut the tube off. Similar considerations prevail with respect to the triode 132. When the flight is West of the center of the approach area, the grid and plate voltages of tube 128 will be in phase and the triode will conduct during positive half cycles of these voltages. As the flight proceeds east of the center but remains within the confines of the approach area as defined by line 111 the grid voltage of tube 132 will be negative during the positive half cycle of the plate voltage, but not sufficiently negative to cut the tube off. Beyond line 111 the negative grid voltage is sufficiently large to cut tube 132 off. The diodes 140 and 142 are provided to permit conduction through the associated relay coils for periods somewhat greater than half cycles and thereby prevent relay chatter. A similar arrangement is employed for the North and South relays associated with the block 106 in FIG. 1. The circuitry just described will be referred to as a "bi-directional relay."

It is desirable that in transferring from course to approach recording and vice versa, the pen 26 be lifted from engagement with the writing surface in order to avoid a pen trace that has no meaning with reference to the flight location. This concept is not new per se; see, for example, the mentioned Dehmel patent. However in accordance with another aspect of the present invention, the pen drop control circuit 88 assumes the form of a bi-directional relay of the type illustrated in FIG. 2 and serves normally to maintain a pair of relays PXA and PXB energized. A similar unit is provided in the Y block 57 and serves to maintain a pair of relays PYA and PYB normally energized. Under normal conditions of plotting on one map or the other, the summing amplifier 70 will produce a small residual error signal that is sufficient to continue operation of the servo 66 so as to minimize such error signal. Upon change of scale however, the error signal experiences a large increase in magnitude, dictating pen transfer. This fact is taken advantage of to deenergize both relays PXA and PXB. The pen drop control circuit 88 receives an error input signal from the summing amplifier 70. This signal is of too small a magnitude to deenergize the relays under normal conditions but becomes sufficiently large to produce this effect upon change of state of the A relay. The relays PXA and PXB and similarly the relays PYA and PYB will continue their states of deenergization while the pen 26 homes in on its newly required position, whence the error signals will resume normal magnitudes, the relays will operate once more, and the pen will drop once more.

The choice of the bi-directional relay circuitry with its associated two relays for unit 88 is to avoid undesired relay deenergization due to stray pick up quadrature voltages. Such undesired operation had occurred with prior art apparatus and was enhanced by reason of the fact that the residual error voltage under normal conditions is relatively low. The bi-directional relay circuitry is substantially insensitive to quadrature voltages.

Referring to FIG. 3, the pen 26 is normally maintained in the writing-surface-engaging dropped position by the normally energized pen solenoid 90 contained within housing 58. The fact of energization of the solenoid to drop and of deenergization to lift is preferred to the converse as this results in protection of the pen when power to the recorder is turned off. The solenoid is energized over the series circuit extending from the source $+E_{dc}$ through the NO contacts 1 of the PXA, PXB, PYA and PYB relay and the NC contact 7 of the approach relay through the solenoid to ground, in the case of course recording. In order to differentiate the approach trace from the course trace, the pen 26 is caused alternately to be dropped and lifted on approach recording. In this case the energization circuit instead of passing through the NC contact 4 of relay A passes through its NO contact 4 and then through a switch 92 driven by a cam 94 to the solenoid coil. The cam 94 is driven by a motor 96 that is energized from the source $+E_{dc}$ through the NO contact 8 of the A relay. The cam 94 alternately opens and closes switch 92 thereby alternately interrupting and completing the energization circuit for the solenoid. As a result the pen 26 traces a dashed line path. It is to be noted that deenergization of anyone of the four pen drop relays is sufficient to lift the pen irrespective of course or approach selection, so that as desired, the pen 26 is lifted while homing during map transfer.

FIG. 4 illustrates an alternative to the arrangement of FIG. 3. Here the operation is the same for course recording. However a second solenoid 91 is connected to the NO contact 7 of relay A and ground. It is effective to drop and lift a second pen 27 according to whether approach or course is selected, concurrently with the lifting and dropping of pen 26. In this arrangement the pens are supplied with ink of different colors for the purpose of differentiation of the approach and course plots. The pens 26 and 27 are arranged to engage the writing surface at the same point were they dropped simultaneously, which of course they are not. Suitable combinations of colors for the pens and also for the lights 28 and 30 are described in the mentioned Eisenstark patent.

The described invention admits of many modifications. For example, instead of imparting motion to the pen 26 in both X and Y dimensions, the pen and the solenoid block 58 may be maintained stationary and the X and Y drives be utilized to drive the map assembly including the lights 28 and 30, or the map assembly may be driven in one dimension and the pen in the other. The invention may also be utilized in connection with a single recording surface which to greater extent constitutes the course map with an insert map section reserved for the approach map. Assume for example that the dimensions of the insert approach map are each one quarter of the entire recording surface, and that the course and approach maps are concentric physically, although not necessarily geographically. In order to achieve the correct relations for intermap transfer it is merely necessary that the amplifier 100 be given a gain of four times the previous magnitude, and similarly for the corresponding amplifier in the unit YAF–1. Alternatively, this may be accomplished by suitable change of the $\pm E/2$ voltages applied to the terminals 2 and 4 of the X and Y units to $\pm 2E$ voltages. For a further example, if additionally the center of the approach map is to be physically, although not necessarily geographically, noncoincident with that of the course map, a bias voltage, derived from a potentiometer configuration similar to potentiometer 82, may be applied to the amplifier 70 through an additional NO contact of the A relay. Similar provisions are made in the Y unit 57.

The invention is applicable to a course map provided with conic projection coordinates instead of Cartesian coordinates to take into account earth curvature effects. In this case the means for generating the $\dot{x}$ and $\dot{y}$ voltages are given correction voltages which may be derived from the slider 78 and the corresponding slider in the Y unit 57 and utilized in the manner described in Patent No. 2,829,446. At the same time the XAF1 and YAF1 outputs are not applied directly to their respective switches 102a and 102b; rather additional circuitry is inserted, illustrated in FIG. 5, to which reference is now made. The XAF and YAF units are seen to energize stator windings 144 and 150 of individual resolvers, respectively. The X resolver is provided with a pair of rotor windings 146 and 148 arranged in space quatrature while the Y resolver is provided with a pair of similar rotor windings 152 and 154. The four rotor windings are positioned in unison by operation of a dial 156 in accordance with the angle of meridian tilt $\theta$ of the center of the approach area. Accordingly the winding 146 derives a voltage $X_R \cos \theta$, whereas winding 152 derives a voltage $Y_R \sin \theta$. These two voltages are applied to a summing amplifier 158 whose output is connected to the switch 102a. Also the winding 148 derives a voltage $X_R \sin \theta$ and winding 154 a voltage $-Y_R \cos \theta$. The latter two voltages are applied to the summing amplifier 160 which is connected to the switch 102b. For a proof of the validity of the trigonometric resolution of the $X_R$ and $Y_R$ voltages as described, reference is made to the aforesaid United States Patent No. 2,857,234.

Thus it will be seen that in accordance with the present invention I have provided a dual course recording system, which is of particular convenience in use, is particularly simple to construct and admits of ready incorporation in existing recording systems. The automatic map transfer arrangement, coupled with the display of only the map instantly under consideration, is particularly convenient and minimizes human error in interpretation of the recording data.

While there have been described the basic concept of the invention and several modifications thereof, it should be understood that further modifications may occur to those skilled in the art and it is intended that all such modifications be comprehended within the invention as defined by the spirit and scope of the appended claims.

What is claimed is:

1. A bi-directional relay comprising a pair of electron amplifying devices each having a control terminal and a pair of output circuit terminals; means for applying direct bias and sinusoidal alternating signal potentials to each of said control terminals; an output circuit connected to each of said output circuit terminal pairs; means for applying sinusoidal alternating energizing potential to each of said output circuits, the energizing and signal potentials associated with one of said amplifying devices having a phase relation that is opposite to that of the energizing and signal potentials associated with the other, whereby in the absence of application of alternating signal potential said devices and associated output circuits are in a first significant state of current conduction, and whereby when the signal applied to the control terminal of one of said electron amplifying devices is of one phase and of predetermined threshold magnitude said one device is placed in an opposite state of current conduction, and when applied to the control terminal of the other device and of opposite phase and of predetermined threshold magnitude the other device is placed in said opposite state of current conduction, one of said two states being conduction of uni-directional current flow through the respective output circuit during half cycle periods of the respective energizing potential and the other of said two states being a non-conducting state; and means sensing the states of conduction of said devices.

2. A bi-directional relay comprising a pair of electron amplifying devices each having a control terminal and a pair of output circuit terminals; means for applying common direct bias and common sinusoidal alternating signal potential to said control terminals; an output circuit connected to each of said output circuit terminal pairs; means for applying phase opposition sinusoidal alternating energizing potentials to said output circuits respectively, whereby in the absence of application of alternating signal potential said devices and associated output circuits are in a first significant state of current conduction, and whereby when the alternating signal applied to said control terminals is of one phase and of predetermined threshold magnitude said one device is placed in an opposite state of current conduction, and when of opposite phase and of predetermined threshold magnitude the other device is placed in said opposite state of current conduction, one of said two states being conduction of uni-directional current flow through the respective output circuit during half-cycle periods of the respective energizing potential and the other of said two states being a non-conducting state; and means sensing the states of conduction of said devices.

3. A bi-directional relay comprising a pair of electron amplifying devices each having a control terminal and a pair of output circuit terminals; means for applying common direct bias and common sinusoidal alternating signal potential to said control terminals; an output circuit including the coil of a relay connected to each of said output circuit terminal pairs; means for applying phase opposition sinusoidal alternating energizing potentials to said output circuits respectively, whereby in the absence of application of alternating signal potential said output circuit relays are in a first significant switching state, and whereby when the alternating signal applied to said control terminal of one of said electron amplifying devices is of one phase and of predetermined threshold magnitude the associated output circuit relay is placed in a second significant switching state, and when of opposite phase and of predetermined threshold magnitude the other output circuit relay is placed in said second significant switching state, one of said two states being relay energization and the other relay deenergization.

4. The combination of an amplitude sensitive amplifier with a bi-directional relay as specified in claim 3, said amplitude sensitive amplifier receiving a sinusoidal alternating input signal of variable magnitude and phase and delivering a sinusoidal alternating output signal which has non-zero magnitude only when the input signal exceeds a predetermined minimum threshold amplitude, said output signal being the aforesaid alternating signal potential applied to the aforesaid control terminals, whereby the range of operation of said bi-directional relay is extended.

References Cited by the Examiner

UNITED STATES PATENTS

| 2,511,671 | 6/50 | Jacob | 328—135 |
| 2,907,932 | 10/59 | Patchell | 307—88.5 |
| 3,056,090 | 9/62 | Chapmon | 328—115 |

SAMUEL BERNSTEIN, *Primary Examiner.*

JOHN W. HUCKERT, *Examiner.*